United States Patent
Huang et al.

(10) Patent No.: US 11,759,868 B2
(45) Date of Patent: Sep. 19, 2023

(54) HOLDER FOR A VIBRATION-ASSISTED CUTTING TOOL

(71) Applicant: National Pingtung University of Science and Technology, Pingtung County (TW)

(72) Inventors: Wei-Tai Huang, Kaohsiung (TW); Xi-Sang Chen, New Taipei (TW); Zhi-Yao Tu, Pingtung County (TW)

(73) Assignee: National Pingtung University of Science and Technology, Pingtung County (TW)

( * ) Notice: Subject to any disclaimer, the term of this patent is extended or adjusted under 35 U.S.C. 154(b) by 52 days.

(21) Appl. No.: 17/528,264

(22) Filed: Nov. 17, 2021

(65) Prior Publication Data
US 2022/0371098 A1   Nov. 24, 2022

(30) Foreign Application Priority Data
May 24, 2021   (TW) ................... 110118725

(51) Int. Cl.
*B23B 29/12*   (2006.01)
(52) U.S. Cl.
CPC ........ *B23B 29/125* (2013.01); *B23B 2210/08* (2013.01)
(58) Field of Classification Search
CPC ....... B23B 29/125; B23B 29/04; B23B 29/22; B23B 29/14; B23B 2210/08; B23B 2260/004; B23B 2260/03; B23B 2260/082; B23B 2260/108; B23B 2260/068; B23B 2260/072; B23B 2260/134; B23B 2270/08; B23B 2205/04
See application file for complete search history.

(56) References Cited

U.S. PATENT DOCUMENTS

| 3,739,665 A | * | 6/1973 | Kumabe ............... B23B 29/125 407/120 |
| 5,718,154 A | | 2/1998 | Council, Jr. |
| 8,047,104 B2 | | 11/2011 | Imai et al. |

FOREIGN PATENT DOCUMENTS

| CN | 206763927 U | | 12/2017 |
| JP | 62048401 A | * | 3/1987 |
| TW | M481777 | | 7/2014 |

(Continued)

OTHER PUBLICATIONS

TWI556891B Machine Translation (Year: 2016).*
(Continued)

*Primary Examiner* — Sunil K Singh
*Assistant Examiner* — Joshua S Hearne
(74) *Attorney, Agent, or Firm* — Demian K. Jackson; Jackson IPG PLLC

(57) ABSTRACT

A holder provided for mounting of a lathe cutter includes a carrier, a first joint seat, a second joint seat, a limit rod and a clamp member. The first and second joint seats are disposed on a first and second base of the carrier respectively. The lathe cutter is mounted between the first and second joint seats. The limit rod is inserted into a through hole of the lathe cutter, and a first and second ends of the limit rod are coupled to the first and second joint seats respectively. The clamp member is disposed on the limit rod. The clamp member and the second joint seat are provided to clamp the lathe cutter to separate the lathe cutter from the first and second bases.

16 Claims, 3 Drawing Sheets

(56) References Cited

FOREIGN PATENT DOCUMENTS

| TW | I556891 | | 11/2016 |
|----|---------|---|---------|
| TW | I556891 B | * | 11/2016 |
| TW | I572428 | | 3/2017 |

OTHER PUBLICATIONS

JP62048401A Machine Translation (Year: 1987).*
Taiwanese Office Action dated Feb. 22, 2022 for Taiwanese Patent Application No. 110118725, 4 pages.

* cited by examiner

HOLDER FOR A VIBRATION-ASSISTED CUTTING TOOL

FIELD OF THE INVENTION

This invention relates to a holder for a cutting tool, and more particularly to a holder for a vibration-assisted cutting tool.

BACKGROUND OF THE INVENTION

Conventionally, in order to prevent a lathe tool mounted on a holder from shifting or shaking during cutting process, gasket or screw bolt may be provided to mount the lathe tool on the holder tightly. For instance, Taiwan Patent TW 1572428 (application No. 103110714) discloses an adjustable bit holder which uses a movable element and a plurality of locating elements to mount a lathe tool on a base, the locating elements are provided to pack the lathe tool on the movable element so as to reduce shifting or shaking of the lathe tool caused by external force during cutting process.

However, the lathe tool mounted on the holder tightly is not suitable for vibration-assisted vibration cutting.

SUMMARY

One object of the present invention is to provide a holder for mounting of a lathe cutter having a through hole and used in cutting process.

A holder of the present invention is provided for mounting of a lathe cutter and includes a carrier, a first joint seat, a second joint seat, a limit rod and a clamp member. The carrier includes a first base, a second base and an accommodation space located between the first and second bases. The first joint seat is mounted on the first base, the second joint seat is mounted on the second base and includes a clamping portion and a first resonance arm which are located in the accommodation space and coupled to one another. The first resonance arm is located between the second base and the clamping portion, the clamping portion is provided to clamp the lathe cutter. The clamping portion has a first width and the first resonance arm has a second width along a direction of a horizontal axis, and the first width is greater than the second width. The limit rod is used to be inserted into a through hole of the lathe cutter and includes a first end, a second end and a central portion which is located between the first and second ends and includes a second resonance arm connected to the first end. The first and second ends of the limit rod are coupled to the first joint seat and the clamping portion respectively such that the first joint seat, the second joint seat and the limit rod are coupled together. The central portion is provided to be inserted into the through hole of the lathe cutter. The clamp portion is mounted on the central portion and does not cover the second resonance arm. A clamping space between the clap member and the clamping portion is used to accommodate the lathe cutter, and the clamp member and the clamping portion are used to clamp the lathe cutter to separate the lathe cutter from the first and second bases.

In the present invention, the stiffness of the second joint seat is decreased by designing the first resonance arm narrower than the clamping portion such that vibration of the lathe cutter can work effectively during cutting to improve vibration-assisted cutting performance of the lathe cutter.

DETAILED DESCRIPTION OF THE INVENTION

Figure 1:
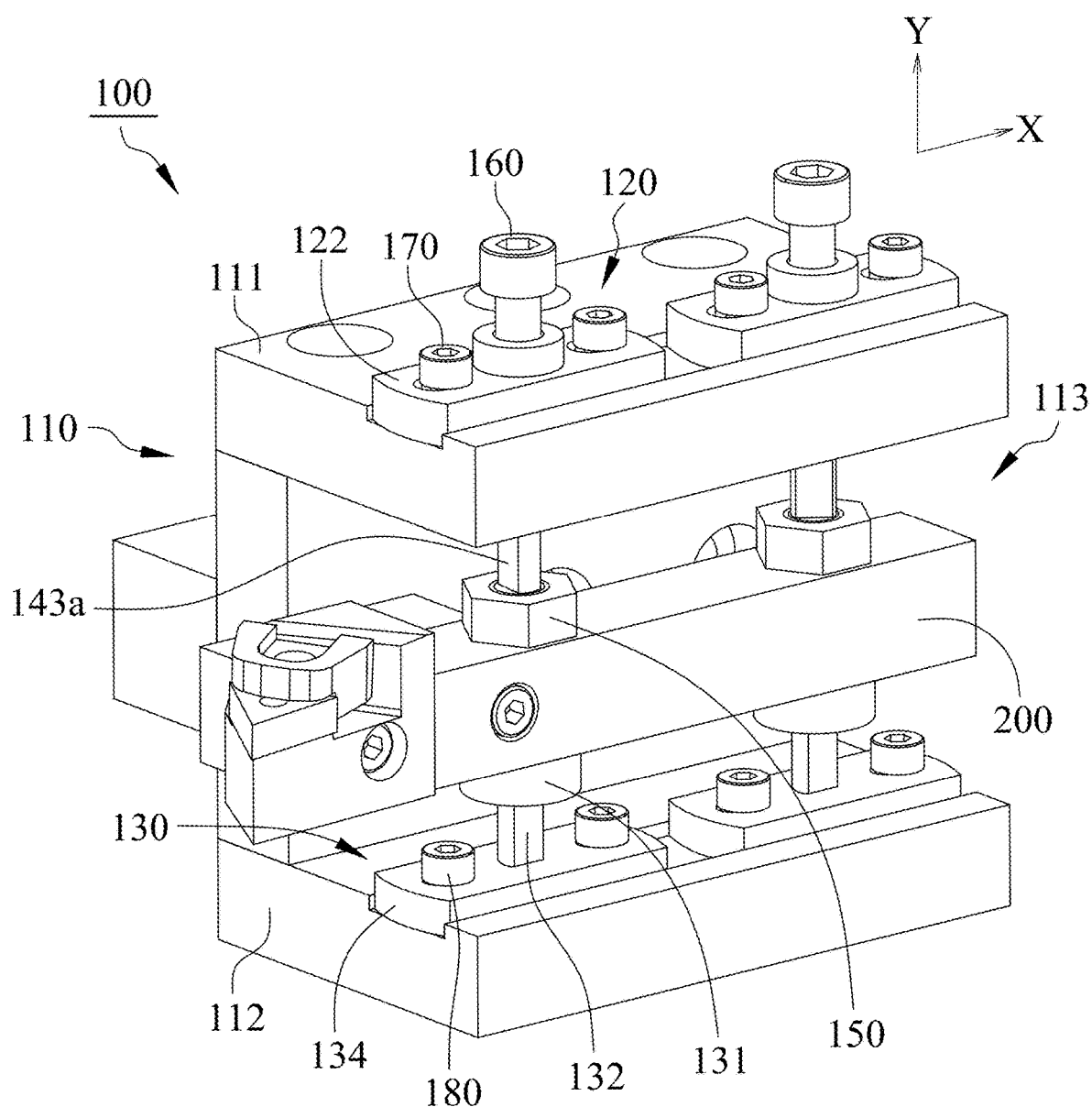
FIG. 1 is a perspective assembly diagram illustrating a holder for vibration-assisted cutting tool in accordance with one embodiment of the present invention.
Figure 2:
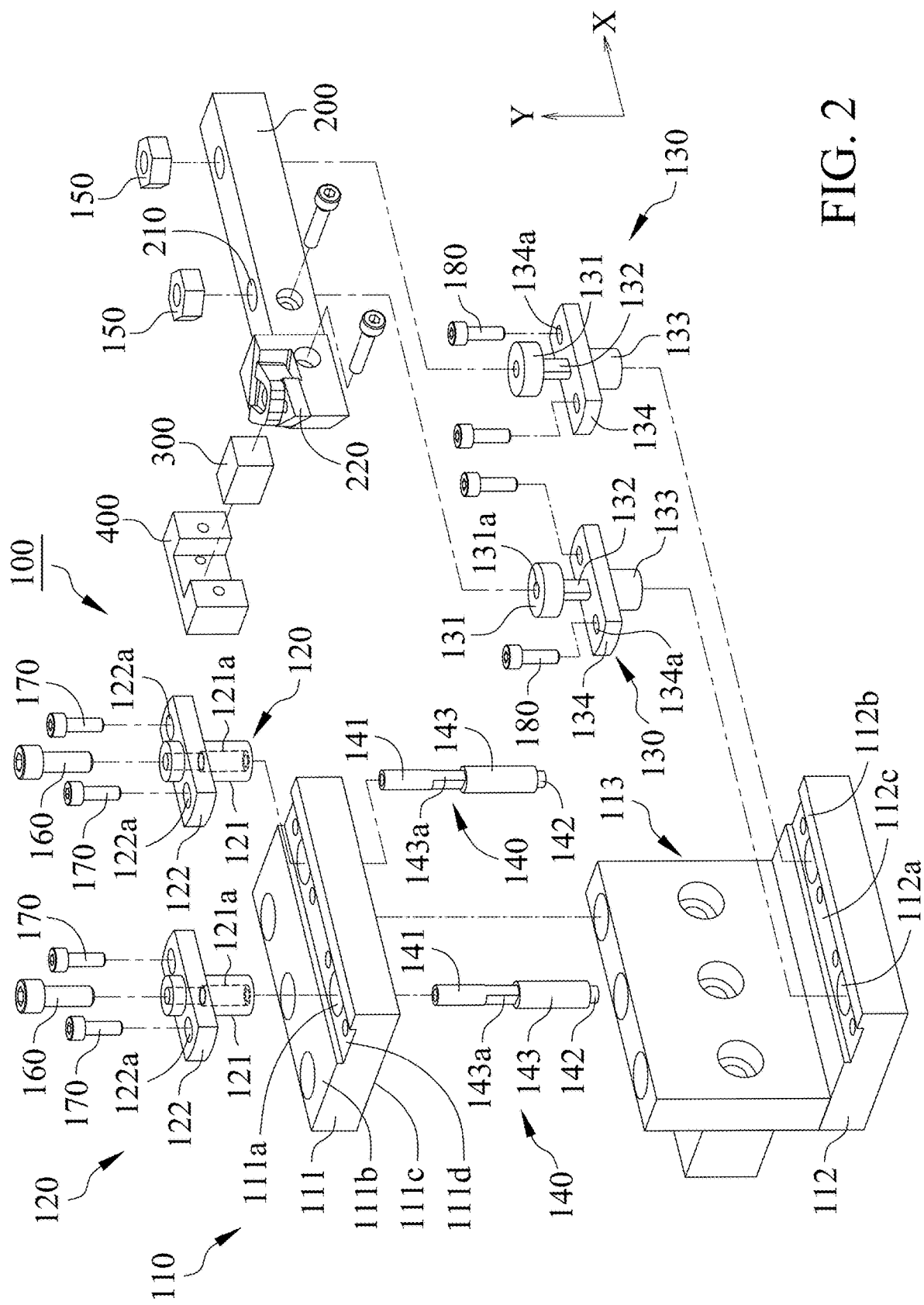
FIG. 2 is a perspective exploded diagram illustrating the holder for vibration-assisted cutting tool in accordance with one embodiment of the present invention.
Figure 3:
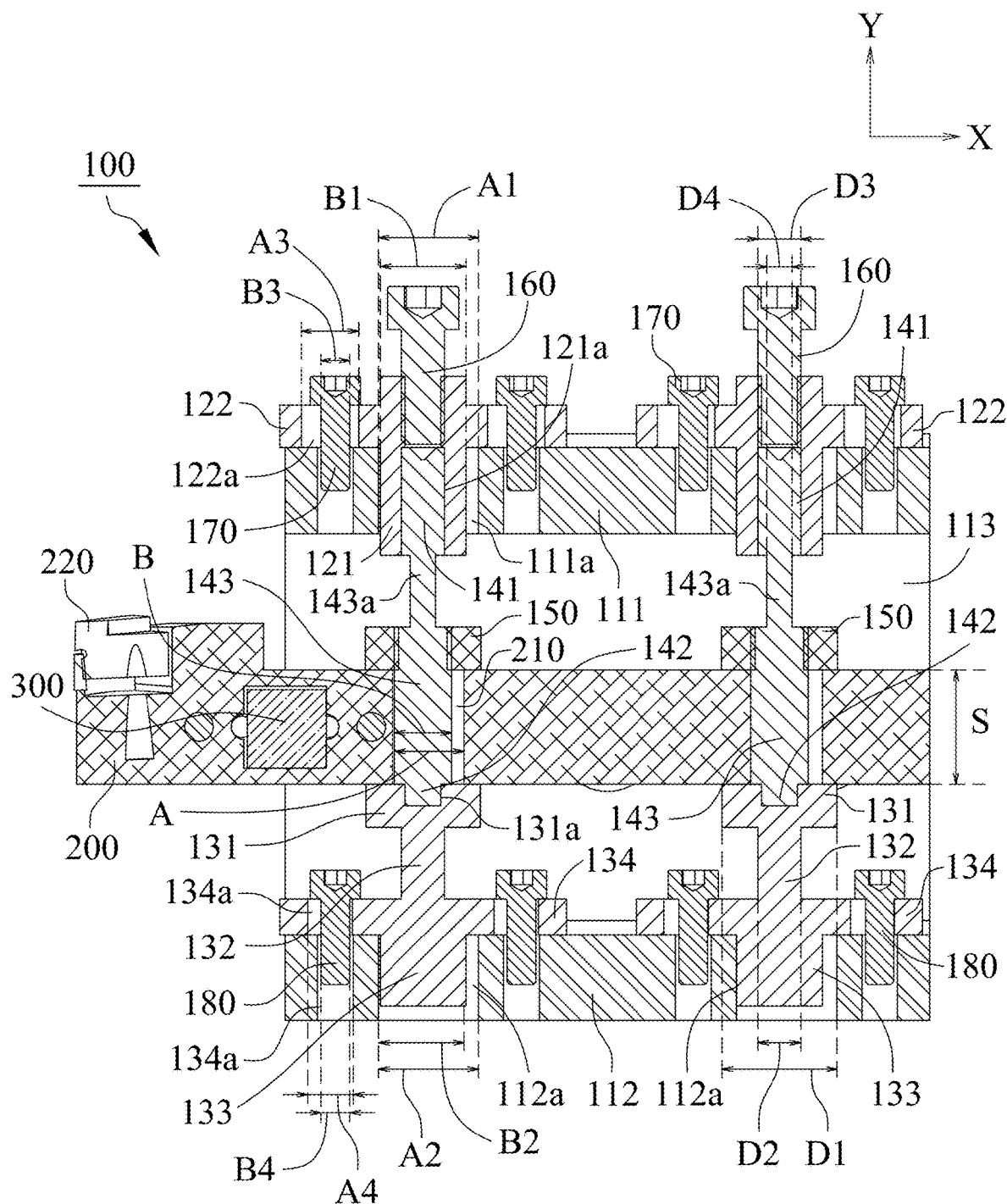
FIG. 3 is a cross-section view diagram illustrating the holder for vibration-assisted cutting tool in accordance with one embodiment of the present invention.

With reference to FIGS. 1 to 3, a holder 100 for a vibration-assisted cutting tool is provided for mounting of a latch cutter 200. In this embodiment, a vibration member 300 is provided on the lathe cutter 200 to generate vibration, e.g. ultrasonic vibration, so as to process a workpiece using vibration-assisted cutting. The vibration member 300 is, but not limited to, a piezoelectric element, and preferably, the vibration member 300 is mounted on the lathe cutter 200 by a limit member 400.

With reference to FIGS. 1 to 3, the holder 100 includes a carrier 110, at least one first joint seat 120, at least one second joint seat 130, at least one limit rod 140 and at least one clamp member 150. The carrier 110 includes a first base 111, a second base 112 and an accommodation space 113 located between the first base 111 and the second base 112. In this embodiment, the first base 111 and the second base 112 can be assembled together by at least one screw bolt (not shown).

With reference to FIGS. 1 to 3, the first joint seat 120 is mounted on the first base 111 which has an external surface 111b and a first internal surface 111c. The first internal surface 111c faces toward the accommodation space 113, and the first joint seat 120 is mounted on the external surface 111b in this embodiment.

With reference to FIGS. 1 to 3, the second joint seat 130 is disposed on the second base 112 which has a second internal surface 112b facing toward the first internal surface 111c, the accommodation space 113 is located between the first internal surface 111c and the second internal surface 112b. In this embodiment, the second joint seat 130 is disposed on the second internal surface 112b. The second joint seat 130 includes a clamping portion 131 and a first resonance arm 132 which are located in the accommodation space 113 and coupled to one another, the first resonance arm 132 is located between the second base 112 and the clamping portion 131, and the clamping portion 131 is provided to clamp the lathe cutter 200. Along a direction of a horizontal axis X, the clamping portion 131 has a first width D1 and the first resonance arm 132 has a second width D2, and the first width D1 is greater than the second width D2.

With reference to FIGS. 1 to 3, in this embodiment, at least one second joint hole 112a is provided on the second internal surface 112b of the second base 112 and communicates to the accommodation space 113. The second joint seat 130 further includes a second joint post 133 and its first resonance arm 132 is located between the clamping portion 131 and the second joint post 133. The second joint post 133 is disposed in the second joint hole 112a to couple the second joint seat 130 to the second base 112.

With reference to FIGS. 1 to 3, the limit rod 140 is inserted into a through hole 210 of the lathe cutter 200 and includes a first end 141, a second end 142 and a central portion 143 which is located between the first end 141 and the second end 142. The central portion 143 is connected to the first end 141 by a second resonance arm 143a, and the first end 141 is jointed to the first joint seat 120. In this embodiment, the first base 111 includes at least one first joint hole 111a communicating to the accommodation space 113 and the first joint seat 120 includes a first joint post 121 which is inserted into the first joint hole 111a to allow the first joint seat 120 to be coupled to the first base 111. The first end 141 of the limit rod 140 is jointed to the first joint post 121, and preferably, the first end 141 of the limit rod 140 is inserted into a first accommodation hole 121a of the first joint post 121. The second end 142 of the limit rod 140 is coupled to the clamping portion 131 such that the first joint seat 120, the second joint seat 130 and the limit rod 140 are coupled together. The central portion 143 of the limit rod 140 is inserted through the through hole 210 of the lathe cutter 200. Preferably, along the direction of the horizontal axis X, the through hole 210 of the lathe cutter 200 has a hole diameter A and the central portion 143 of the limit rod 140 has an external diameter B, the hole diameter A is greater than the external diameter B so lateral vibration of the lathe cutter 200 is not suppressed by the limit rod 140 and a distance from a tool nose 220 of the lathe cutter 200 to the limit rod 140 is adjustable. In this embodiment, the second end 142 of the limit rod 140 is inserted into a second accommodation hole 131a of the clamping portion 131, the second accommodation hole 131a communicates to the accommodation space 113.

With reference to FIGS. 1 to 3, the clamp member 150 is mounted on the central portion 143 of the limit rod 140 but not cover the second resonance arm 143a. The lathe cutter 200 is clamped by the clamp member 150 and the clamping portion 131 within a clamping space S between the clamp member 150 and the clamping portion 131 so that the lathe cutter 200 is separated from the first base 111 and the second base 112. The clamp member 150 is mounted on the central portion 143 and movable along a direction of a vertical axis Y, thus the clamping space S can be adjusted in height. In this embodiment, the clamp member 150 is a nut and screwed on the central portion 143 having a screw thread, and the lathe cutter 200 is clamped between the clamp member 150 and the clamping portion 131 by rotating the clamp member 150. Owing to the first resonance arm 132 having a less width than the clamping portion 131, the stiffness of the second joint seat 130 can be reduced and the vibration generated by the vibration member 300 mounted on the lathe cutter 200 can be effectively used in the vibration-assisted cutting to enhance cutting performance of the lathe cutter 200.

With reference to FIGS. 2 and 3, along the direction of the horizontal axis X, the first end 141 of the limit rod 140 has a third width D3 and the second resonance arm 143a of the central portion 143 of the limit rod 140 has a fourth width D4. The fourth width D4 is less than the third width D3 so as to reduce the stiffness of the limit rod 140 and allow the vibration generated by the vibration member 300 mounted on the lathe cutter 200 to be effectively used in vibration-assisted cutting to enhance cutting performance of the lathe cutter 200.

With reference to FIGS. 1 to 3, the holder 100 further includes at least one fastener 160 that is disposed in the first accommodation hole 121a of the first joint post 121. In this embodiment, the fastener 160 is a screw bolt and the first accommodation hole 121a is screw hole so the fastener 160 is screwed into the first accommodation hole 121a to contact against the first end 141 of the limit rod 140 located in the first accommodation hole 121a. As a result, the limit rod 140 is caged between the first joint seat 120 and the second joint seat 130.

With reference to FIGS. 2 and 3, in this embodiment, the first joint seat 120 further includes a first joint portion 122 where at least one third joint hole 122a is to be formed, the second joint seat 130 further includes a second joint portion 134 where at least one fourth joint hole 134a is to be formed, and the holder 100 further includes at least one first fixing member 170 and at least one second fixing member 180. The fixing member 170 is placed through the third joint hole 122a of the first joint portion 122 to fix the first joint seat 120 on the first base 111, and the second fixing member 180 is placed through the fourth joint hole 134a of the second joint portion 134 to fix the second joint seat 130 on the second base 112. The first fixing member 170 may be a screw bolt provided to be screwed into the third joint hole 122a and screwed on the first base 111 to connect the first joint seat 120 with the first base 111, and the second fixing member 180 may be also a screw bolt provided to be screwed into the fourth joint hole 134a and screwed on the second base 112 to allow the second joint seat 130 and the second base 112 to be jointed together.

With reference to FIGS. 2 and 3, along the direction of the horizontal axis X, the first joint hole 111a on the first base 111 has a first hole diameter A1, the first joint post 121 has a first external diameter B1, the second joint hole 112a on the second base 112 has a second hole diameter A2, and the second joint post 133 has a second external diameter B2. Preferably, the first hole diameter A1 is greater than the first external diameter B1, and the second hole diameter A2 is greater than the second external diameter B2. After the first joint seat 120 and the second joint seat 130 car coupled together by the limit rod 140, the first joint seat 120, the second joint seat 130 and the limit rod 140 can be moved together to allow the first joint post 121 to be moved in the first joint hole 111a and allow the second joint post 133 to be moved in the second joint hole 112a along the direction of the horizontal axis X. Consequently, it is possible to adjust the distance from the tool nose 220 of the lathe cutter 200 to the central portion 143 of the limit rod 140.

With reference to FIGS. 1 to 3, in this embodiment, a first long notch 111d is formed on the external surface 111b of the first base 111 and a second long notch 112c is formed on the second internal surface 112b of the second base 112 along the direction of the horizontal axis X. The first joint hole 111a is located in the first long notch 111d and the second joint hole 112a is located in the second long notch 112c, the first joint portion 122 is slidably mounted in the first long notch 111d and the second joint portion 134 is slidably mounted in the second long notch 112c.

With reference to FIGS. 2 and 3, along the direction of the horizontal axis X, the third joint hole 122a of the first joint portion 122 has a third hole diameter A3, the first fixing member 170 has a third external diameter B3, the fourth joint hole 134a of the second joint portion 134 has a fourth hole diameter A4, and the second fixing member 180 has a fourth external diameter B4. The third hole diameter A3 is greater than the third external diameter B3, and the fourth hole diameter A4 is greater than the fourth external diameter B4. Consequently, the first fixing member 170 still can be inserted into the third joint hole 122a to be screwed on the first base 111 and the second fixing member 180 still can be inserted into the fourth joint hole 134a to be screwed on the second base 112 as the first joint seat 120 and the second joint seat 130 are moved along the direction of the horizontal axis X for adjustment.

With reference to FIGS. 2 and 3, the stiffness of the second joint seat 130 and the limit rod 140 are reduced because of the first resonance arm 132 narrower than the clamping portion 131 and the second resonance arm 143a narrower than the first end 141 of the limit rod 140, vibration generated by the vibration member 300 mounted on the lathe cutter 200 can be used effectively during cutting to enhance cutting performance of the lathe cutter 200.

While this invention has been particularly illustrated and described in detail with respect to the preferred embodiments thereof, it will be clearly understood by those skilled in the art that is not limited to the specific features shown and described and various modified and changed in form and details may be made without departing from the scope of the claims.

What is claimed is:

1. A holder configured for mounting of a lathe cutter comprising:
   a carrier including a first base, a second base and an accommodation space located between the first and second bases;
   a first joint seat disposed on the first base;
   a second joint seat disposed on the second base and including a clamping portion and a first resonance arm which are located in the accommodation space and coupled to one another, the first resonance arm is located between the second base and the clamping portion, the clamping portion is configured to clamp the lathe cutter, the clamping portion has a first width and the first resonance arm has a second width along a direction of a horizontal axis, and the first width is greater than the second width;
   a limit rod configured to be inserted into a through hole of the lathe cutter and including a first end, a second end and a central portion which is located between the first and second ends and includes a second resonance arm connected to the first end, the first end is configured to be coupled to the first joint seat and the second end is configured to be coupled to the clamping portion such that the first joint seat, the second joint seat and the limit rod are configured to be coupled together, the central portion is configured to be inserted into the through hole of the lathe cutter; and
   a clamp member disposed on the central portion and configured to not cover the second resonance arm, a clamping space existing between the clamp member and the clamping portion of the second joint seat is configured to accommodate the lathe cutter, the clamp member and the clamping portion of the second joint seat are configured to clamp the lathe cutter to separate the lathe cutter from the first and second bases, wherein the clamp member disposed on the central portion of the limit rod is movable along a direction of a vertical axis to adjust the clamping space in height.

2. The holder in accordance with claim 1, wherein the first end of the limit rod has a third width and the second resonance arm has a fourth width along the direction of the horizontal axis, and the fourth width is less than the third width.

3. The holder in accordance with claim 1, wherein the through hole of the lathe cutter has a hole diameter and the central portion of the limit rod has an external diameter along the direction of the horizontal axis, and the hole diameter of the through hole is greater than the external diameter of the central portion.

4. The holder in accordance with claim 1, wherein there is a first joint hole communicating to the accommodation space on the first base, a first joint post of the first joint seat is disposed in the first joint hole, and the first end of the limit rod is coupled to the first joint post.

5. The holder in accordance with claim 4, wherein the first end of the limit rod is disposed in a first accommodation hole of the first joint post.

6. The holder in accordance with claim 5 further comprising a fastener disposed in the first accommodation hole of the first joint post, wherein the fastener is configured to contact the first end of the limit rod located in the first accommodation hole to block the limit rod between the first and second joint seats.

7. The holder in accordance with claim 4, wherein the first joint hole has a first hole diameter and the first joint post has a first external diameter along the direction of the horizontal axis, and the first hole diameter is greater than the first external diameter.

8. The holder in accordance with claim 7 further comprising at least one first fixing member, wherein the first joint seat further includes a first joint portion having a third joint hole, the third joint hole has a third hole diameter and the at least one first fixing member has a third external diameter along the direction of the horizontal axis, the third hole diameter is greater than the third external diameter, the at least one first fixing member is configured to be inserted into the third joint hole to fix the first joint seat on the first base.

9. The holder in accordance with claim 8, wherein a first long notch is formed on an external surface of the first base along the direction of the horizontal axis, the first joint hole of the first base is located in the first long notch, and the first joint portion of the first joint seat is slidably disposed in the first long notch.

10. The holder in accordance with claim 1, wherein there is a second joint hole communicating to the accommodation space on the second base, the second joint seat further includes a second joint post, the first resonance arm of the second joint seat is located between the clamping portion and the second joint post, the second joint post is disposed in the second joint hole.

11. The holder in accordance with claim 10, wherein the second joint hole has a second hole diameter and the second joint post has a second external diameter along the direction of the horizontal axis, and the second hole diameter is greater than the second external diameter.

12. The holder in accordance with claim 11 further comprising at least one second fixing member, wherein the second joint seat further includes a second joint portion having a fourth joint hole, the at least one second fixing member has a fourth external diameter and the fourth joint hole has a fourth hole diameter along the direction of the horizontal axis, the fourth hole diameter is greater than the fourth external diameter, the at least one second fixing member is configured to be inserted into the fourth joint hole to fix the second joint seat on the second base.

13. The holder in accordance with claim 12, wherein a second long notch is formed on a second internal surface of the second base along the direction of the horizontal axis, the second joint hole of the second base is located in the second long notch, and the second joint portion of the second joint seat is slidably disposed in the second long notch.

14. The holder in accordance with claim 1, wherein the second end of the limit rod is disposed in a second accommodation hole of the clamping portion of the second joint seat, the second accommodation hole communicates to the accommodation space.

15. A holder configured for mounting of a lathe cutter comprising:
   a carrier including a first base, a second base and an accommodation space located between the first and second bases;

a first joint seat disposed on the first base;
a second joint seat disposed on the second base and including a clamping portion and a first resonance arm which are located in the accommodation space and coupled to one another, the first resonance arm is located between the second base and the clamping portion, the clamping portion is configured to clamp the lathe cutter, the clamping portion has a first width and the first resonance arm has a second width along a direction of a horizontal axis, and the first width is greater than the second width;
a limit rod configured to be inserted into a through hole of the lathe cutter and including a first end, a second end and a central portion which is located between the first and second ends and includes a second resonance arm connected to the first end, the first end is configured to be coupled to the first joint seat and the second end is configured to be coupled to the clamping portion such that the first joint seat, the second joint seat and the limit rod are configured to be coupled together, the central portion is configured to be inserted into the through hole of the lathe cutter; and
a clamp member disposed on the central portion and configured to not cover the second resonance arm, a clamping space existing between the clamp member and the clamping portion of the second joint seat is configured to accommodate the lathe cutter, the clamp member and the clamping portion of the second joint seat are configured to clamp the lathe cutter to separate the lathe cutter from the first and second bases,
wherein there is a first joint hole communicating to the accommodation space on the first base, a first joint post of the first joint seat is disposed in the first joint hole, and the first end of the limit rod is coupled to the first joint post,
wherein the first end of the limit rod is disposed in a first accommodation hole of the first joint post.

16. A holder configured for mounting of a lathe cutter comprising:
a carrier including a first base, a second base and an accommodation space located between the first and second bases;
a first joint seat disposed on the first base;
a second joint seat disposed on the second base and including a clamping portion and a first resonance arm which are located in the accommodation space and coupled to one another, the first resonance arm is located between the second base and the clamping portion, the clamping portion is configured to clamp the lathe cutter, the clamping portion has a first width and the first resonance arm has a second width along a direction of a horizontal axis, and the first width is greater than the second width;
a limit rod configured to be inserted into a through hole of the lathe cutter and including a first end, a second end and a central portion which is located between the first and second ends and includes a second resonance arm connected to the first end, the first end is configured to be coupled to the first joint seat and the second end is configured to be coupled to the clamping portion such that the first joint seat, the second joint seat and the limit rod are configured to be coupled together, the central portion is configured to be inserted into the through hole of the lathe cutter; and
a clamp member disposed on the central portion and configured to not cover the second resonance arm, a clamping space existing between the clamp member and the clamping portion of the second joint seat is configured to accommodate the lathe cutter, the clamp member and the clamping portion of the second joint seat are configured to clamp the lathe cutter to separate the lathe cutter from the first and second bases,
wherein there is a second joint hole communicating to the accommodation space on the second base, the second joint seat further includes a second joint post, the first resonance arm of the second joint seat is located between the clamping portion and the second joint post, the second joint post is disposed in the second joint hole,
wherein the second joint hole has a second hole diameter and the second joint post has a second external diameter along the direction of the horizontal axis, and the second hole diameter is greater than the second external diameter.

* * * * *